(12) United States Patent
Teshima

(10) Patent No.: US 6,654,231 B2
(45) Date of Patent: Nov. 25, 2003

(54) ELECTRONIC DEVICE WITH WIRELESS COMMUNICATION FEATURE

(75) Inventor: Masao Teshima, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 73 days.

(21) Appl. No.: 09/976,578

(22) Filed: Oct. 12, 2001

(65) Prior Publication Data

US 2002/0080565 A1 Jun. 27, 2002

(30) Foreign Application Priority Data

Dec. 27, 2000 (JP) .................................. 2000-398854

(51) Int. Cl.[7] ................................................ G06F 1/16
(52) U.S. Cl. ...................... 361/681; 361/683; 361/686; 361/730; 364/708.1; 343/770
(58) Field of Search ................. 361/681, 683, 361/686, 684, 685, 728–730, 724–727, 748–749; 364/708.1; 439/928; 343/700 MS, 702, 725, 727, 846, 770; 29/600

(56) References Cited

U.S. PATENT DOCUMENTS

| | | | | |
|---|---|---|---|---|
| 5,440,449 A | * | 8/1995 | Scheer ........................ | 361/686 |
| 5,677,698 A | * | 10/1997 | Snowdon .................... | 343/770 |
| 6,249,254 B1 | * | 6/2001 | Bateman et al. ..... | 343/700 MS |
| 6,456,499 B1 | * | 9/2002 | Nakajima et al. ........... | 361/752 |

FOREIGN PATENT DOCUMENTS

| | | |
|---|---|---|
| JP | 5-22184 | 1/1993 |
| JP | 5-75822 | 10/1993 |
| JP | 7-336121 | 12/1995 |
| JP | 9-321521 | 12/1997 |
| JP | 10-163733 | 6/1998 |
| JP | 11-0127010 | 5/1999 |
| JP | 11-177485 | 7/1999 |
| JP | 2000-101333 | 4/2000 |
| JP | 2000-172376 | 6/2000 |
| JP | 2000278036 | 10/2000 |

OTHER PUBLICATIONS

U.S. patent application Ser. No. 09/456,986, Masaki, filed Dec. 7, 1999.

U.S. patent application Ser. No. 09/805,120, Teshima, filed Mar. 14, 2001.

* cited by examiner

*Primary Examiner*—Michael Datskovsky
(74) *Attorney, Agent, or Firm*—Pillsbury Winthrop LLP

(57) ABSTRACT

An electronic device includes a display section and an antenna. The antenna is provided on the back of a display panel within a housing of the display section. The housing of the display section has an opening to surround an area for mounting the antenna. Even with the antenna disposed within the housing of the display section, antenna performance is improved. The electronic device has a reduced size and a higher package density, as well as reliable communications with constant stability.

38 Claims, 4 Drawing Sheets

ELECTRONIC DEVICE WITH WIRELESS COMMUNICATION FEATURE

CROSS-REFERENCE TO RELATED APPLICATIONS

This application is based upon and claims the benefit of priority from prior Japanese Patent Application No. 2000-398854, filed Dec. 27, 2000.

BACKGROUND OF THE INVENTION

1. Field of the Invention

The present invention relates to an electronic device with a communication feature, such as an information processing device like a notebook-type personal computer or a palmtop-type personal computer with a wireless data communication feature.

2. Discussion of the Related Art

In recent years, a portable personal computer provided with a wireless data communication feature has been developed. For mounting an antenna on such a computer, a planar antenna is typically placed within a housing of a display section of a liquid crystal panel, or the like. Recently, however, many display housings of personal computers are often made of a conductor, such as a magnesium alloy in order to reduce thickness or increase strength. In such a case, the placement of an antenna within a display housing causes the antenna to be surrounded entirely by the conductor, thereby failing to provide favorable antenna performance.

U.S. patent application Ser. No. 09/456,986 (filed on Dec. 7, 1999 and allowed on Apr. 19, 2001) assigned to the same assignee as the present application and its divisional application Ser. No. 09/716,466 (filed on Nov. 21, 2000), for example, describe an antenna structure that includes a housing of a display section using a conductive cover made of a magnesium alloy, or the like. A planar antenna is mounted in the housing such that an area for mounting an antenna is shielded by a cover member formed of an insulating member. That is, the housing of the display section is made of the conductive cover member such as a magnesium alloy, except for on the side of the display section. An opening is formed for mounting a planer antenna in the generally central portion of a free end (i.e., the top end when the display section is opened) of the housing of the display section. A shield formed from the conductive member is provided for each surface within the antenna housing. A planar antenna is fixed in the opening through an insulating member on the bottom surface of the antenna housing, and its upper opening is covered with the same insulating member.

Such an antenna structure insulates radiation noise from the liquid crystal display (LCD) panel and achieves a favorable antenna radiation characteristic with less polarization to provide satisfactory environments for transmission and reception both when the display housing is opened and when it is closed.

Such a mounting, however, requires an extension of the upper portion (free end) of the display housing corresponding to the antenna length due to the need for a large mounting space in the upper portion of the display housing. Therefore, the housing has a larger size than that of a computer provided with no antenna, and has a lower package density. The problem occurs not only in a portable personal computer, but also in a portable information processing terminal and a desktop personal computer as well.

Accordingly, a conventional electronic device with a wireless communication feature has the disadvantage of requiring extra space for mounting an antenna, which makes providing a device with a reduced size and a higher package density difficult.

BRIEF SUMMARY OF THE INVENTION

According to an embodiment of the present invention, an electronic device with a communication feature is provided, which has a housing of a display section and an antenna, that does not require a large space for mounting the antenna in the housing of the display section and which is capable of achieving a reduced size and a higher package density.

According to another embodiment of the present invention, an electronic device is provided, which has a conductive housing of a display section and an antenna, that is capable of improving the performance of the antenna with no loss of reliability even with the antenna placed in the conductive housing of the display section. The electronic device is of a reduced size and of a higher package density, as well as capable of maintaining reliable communications with constant stability.

According to one aspect of the present invention, an electronic device includes a display section with a housing having a display surface on its front. An antenna is provided on a back of the housing. A communication section is configured to perform wireless communications by using the antenna.

BRIEF DESCRIPTION OF THE DRAWINGS

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of an electronic device with a communication feature according to the present invention will now be described with reference to the accompanying drawings.

First Embodiment

Figure 1:
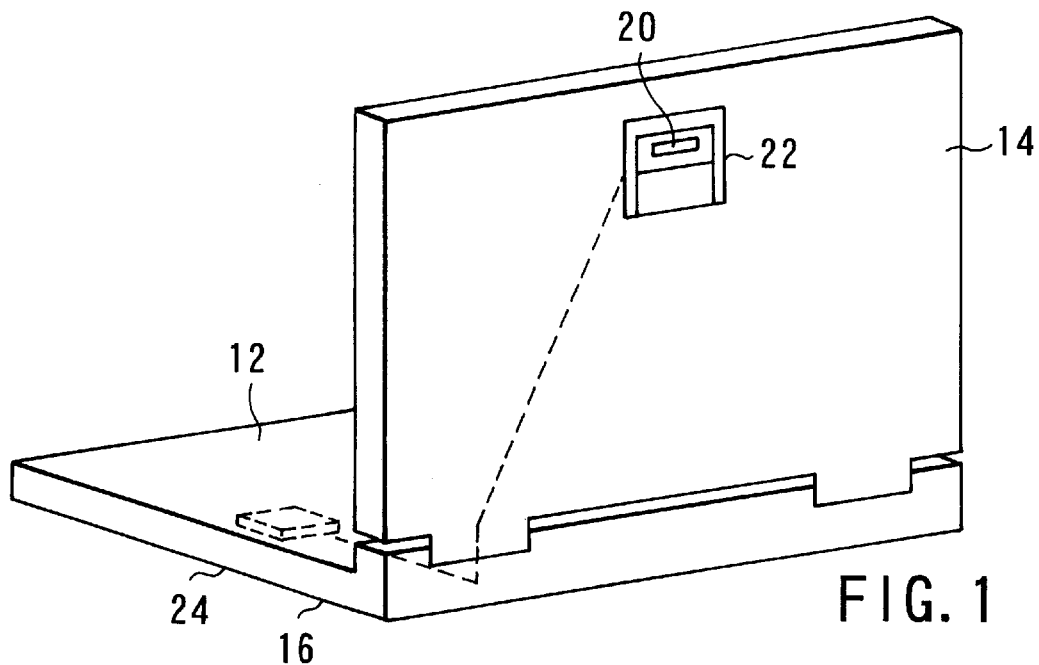
FIG. 1 is a backside perspective view illustrating a first embodiment of an electronic device with a communication feature according to the present invention.
Figure 2:
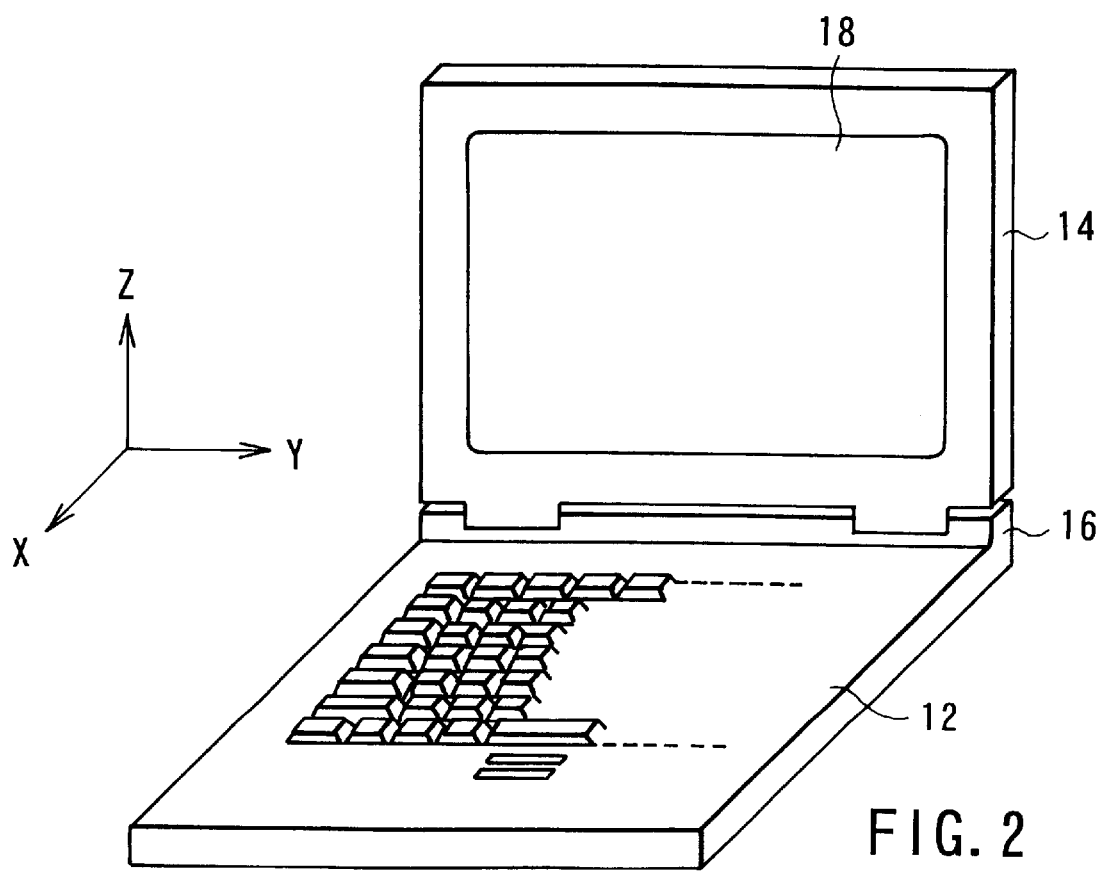
FIG. 2 is a front perspective view illustrating the first embodiment.

FIGS. 1 and 2 show a notebook-type personal computer serving as an electronic device with a wireless communication feature according to the first embodiment. FIGS. 1 and 2 illustrate the personal computer in use with its housing of a display section opened. A body 12 of the personal computer is hereinafter abbreviated as "PC body." A display housing 14 is pivotally supported, on its lower end, to the PC body 12 through a hinge mechanism 16. The display housing 14 employs a conductive cover made of a magnesium alloy, or the like. A liquid crystal display 18 is provided for the display housing 14 as an example of a display panel. The display housing 14 is hereinafter refereed to as "liquid crystal display housing 14."

As shown in FIG. 1, an antenna 20 is placed on the surface of the liquid crystal display housing 14 opposite to the display surface of the liquid crystal display 18. Since the liquid crystal display housing 14 is made of a conductive material, an opening 22 is provided to surround the area for mounting the antenna 20. Although not shown in FIG. 1, a cover made of a material having a small effect on antenna performance, such as plastic, is preferably attached over the opening 22.

In an alternative embodiment of the present invention, the housing 14 may be made of a nonconductive material that has conductive coatings applied thereto. A portion to which the conductive coatings are not applied may be provided on the back of the housing 14. The antenna 20 may be provided in the portion to which the conductive coatings are not applied.

The PC body 12 includes therein a wireless transmit/receive circuit module 24, preferably implemented as a PCI card, or the like. The antenna 20 is connected to the transmit/receive circuit module 24 through, for example, a coaxial cable.

Figure 3:
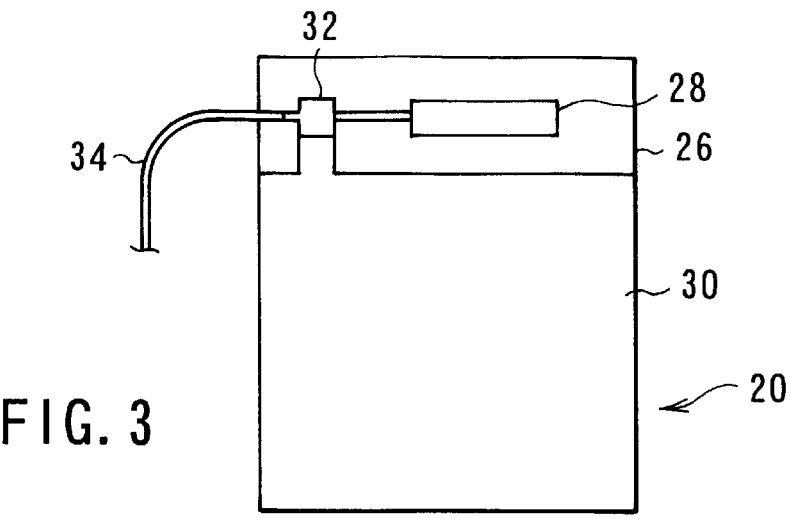
FIG. 3 shows the detailed configuration of an antenna in the first embodiment.

FIG. 3 shows the configuration of the antenna 20 in more detail. An antenna element 28 is mounted on an antenna substrate 26. A chip antenna usable as the antenna element 28 may have an extremely small rectangular parallelepiped shape of several millimeters by several millimeters in cross-sectional dimension and 1 centimeter or less in length. For example, a conductor serving as an antenna pattern is wound helically along its longitudinal direction within a small insulating chip of a rectangular parallelepiped shape mainly made from barium oxide, aluminum oxide, and silica. A resistor is provided on a surface of the chip with its one end connected to the conductor. A feeding terminal is also provided on the surface of the chip for applying voltage to the conductor through the resistor.

The antenna substrate 26 is placed in the opening 22. The antenna substrate 26 is provided with a ground conductor 30 made of a conductive pattern of, for example, copper foil, or the like. The chip antenna has a frequency band of about 100 MHz, and the ground conductor 30 is provided for realizing a wider band when radio frequencies above the 100 MHz are used. The realization of a wider band requires resonance of the ground conductor 30 at the radio frequency used. It is thus necessary for the ground conductor 30 to have a total perimeter close to one wavelength of the radio frequency. For example, the total perimeter of the ground conductor 30 may be set in a range of about 0.7 to about 1.4 of the wavelength of the radio frequency, preferably in a range of about 0.8 to about 1.25, and more preferably in a range of about 0.85 to about 1.05. In this manner, a ground conductor 30 having as large of an area as possible is provided for allowing the antenna 20 to provide better performance. Therefore, when the ground conductor 30 of the antenna substrate 26 is connected to the conductive liquid crystal display housing 14 by a screw made of metal, or the like, the liquid crystal display housing 14 can also serve as a ground conductor to extend the effective area of the ground conductor 30.

The antenna element 28 is connected through a coaxial connector 32 to the coaxial cable 34 which is connected to the transmit/receive circuit module 24 placed within the PC body. The coaxial cable 34 has an inner conductor connected to the antenna element 28 and an outer conductor connected to the grounded conductor 30.

Figure 4:
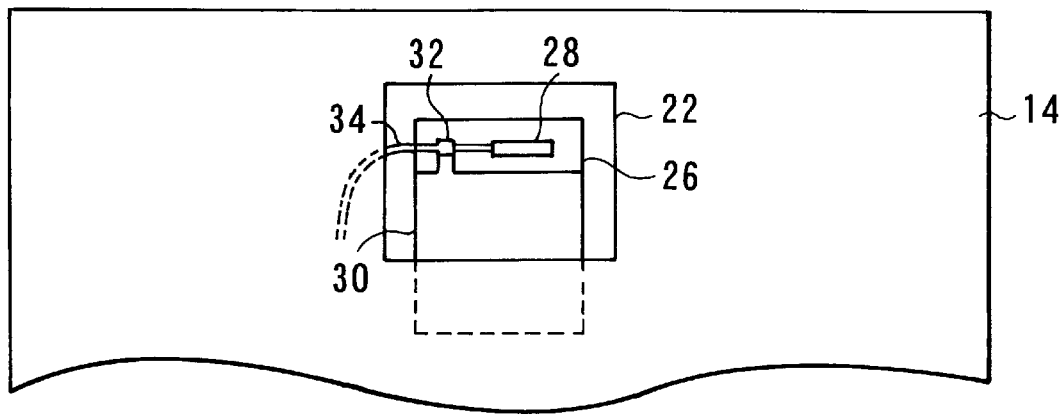
FIG. 4 is an enlarged view showing the mounting area of the antenna in the first embodiment.

FIG. 4 is an enlarged view showing the mounting area of the antenna 20 placed in the liquid crystal display housing 14. The liquid crystal display housing 14 is provided with the opening 22 to surround the mounting area of the antenna 20. The provision of the opening 22 surrounding the mounting area of the antenna 20 serves to reduce the effect of the liquid crystal display housing 14 on antenna performance to provide favorable antenna performance even when the antenna 20 is disposed within the conductive liquid crystal display housing 14.

The opening 22 provided to surround the antenna mounting area is preferably sized such that the perimeter of the opening 22 is longer than one wavelength of the frequency used in radio data communications, thereby making it possible to further reduce the effect of the liquid crystal display housing 14 on the antenna performance.

The opening 22 provided in the liquid crystal display housing 14 is preferably positioned in an upper central portion of the liquid crystal display housing 14 as shown. With such arrangement and configuration of the antenna 20 in the liquid crystal display housing 14, the antenna 20 is positioned symmetrically in the center of the liquid crystal display housing 14 to minimize asymmetry of the antenna radiation characteristic. When the PC body 12 is placed on a desk, the antenna 20 is preferably at the highest possible position, considering the effects of partitions on the desk or other circumstances. While this PC is used with the liquid crystal display housing 14 opened, the upper portion where the antenna 20 is placed is at the highest position and a favorable antenna characteristic can be also achieved in this respect.

Figure 5:
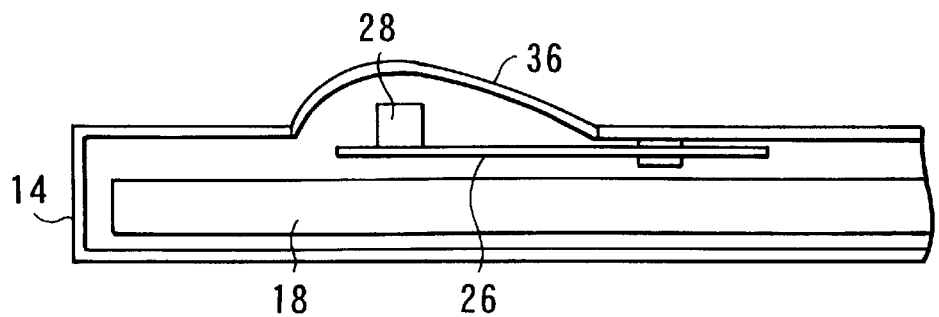
FIG. 5 is a cross sectional side view of a display housing of a liquid crystal display in the first embodiment.

FIG. 5 is a cross sectional view of the liquid crystal display housing 14 viewed from the side. The antenna substrate 26 for mounting the antenna element 28 is coupled to the liquid crystal display housing 14 on the back of the liquid crystal display 18. Since the antenna element 28 projects from the liquid crystal display housing 14, an antenna cover 36 made of plastic, or the like, is preferably attached to the opening 22.

Figure 6:
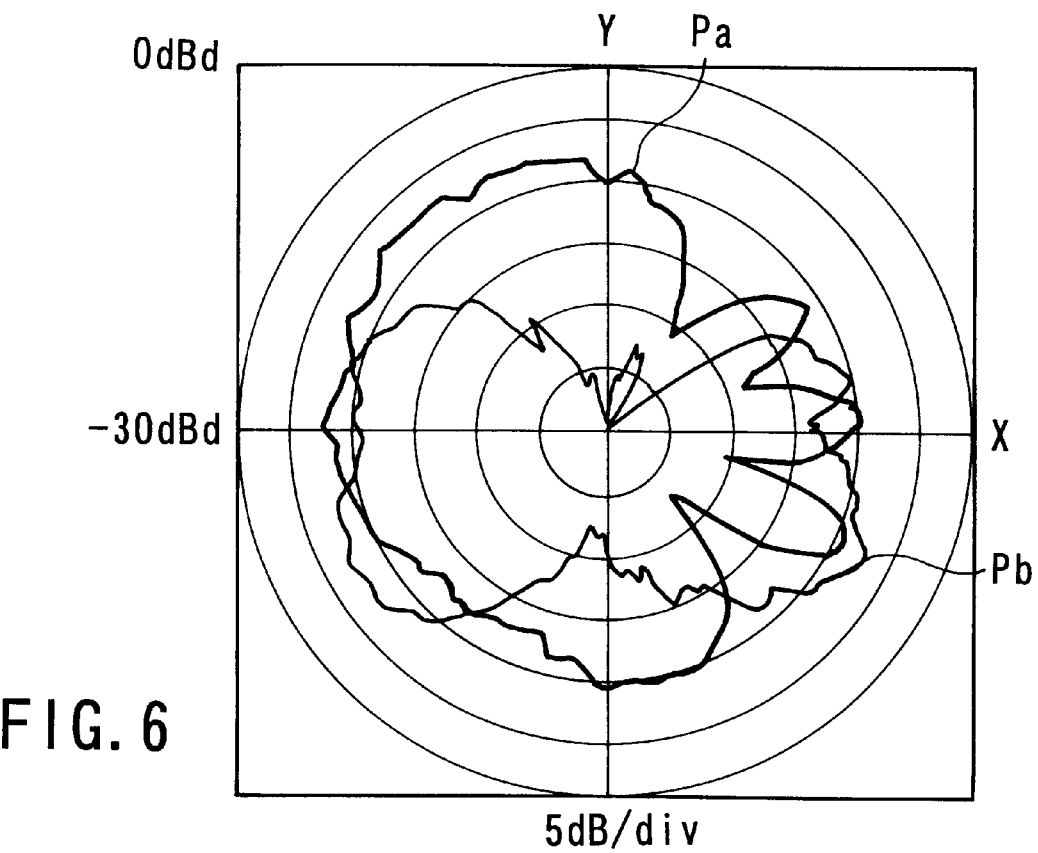
FIG. 6 shows the radiation characteristic of the antenna in use as shown in FIG. 1.

The radiation characteristic of the antenna 20 arranged and configured as descried above is shown in FIG. 6. FIG. 6 shows the radiation characteristic in the X-Y plane viewed from the Z direction (from above the housing), where the X, Y, and Z coordinate system is defined as shown in FIG. 2. In the radiation characteristic pattern, "Pa" represents the radiation characteristic for a horizontally polarized wave, while "Pb" represents the radiation characteristic for a vertically polarized wave.

As apparent from FIG. 6, a favorable characteristic can be accomplished for the horizontally and vertically polarized waves by employing the aforementioned antenna structure and antenna arrangement in the embodiment.

As described above, according to an embodiment of the present invention, in the electronic device having the display housing provided with the display panel, the display housing is preferably made of a conductor, such as a magnesium alloy, to allow the antenna performance to be improved without loss of reliability. Therefore, according to an embodiment of the present invention, the electronic device is capable of reliable wireless data communications with constant stability without being affected by use locations, use states, environments, and the like. Additionally, a large space is not required in the display housing for mounting the antenna, which provides for a reduced size and therefore a higher package density.

The antenna is preferably placed in an upper central portion of the display housing on the back of the display panel. The opening is preferably provided in the portion of the display housing that surrounds the antenna mounting area, thereby eliminating the need for a large space to mount the antenna within the display housing. Thus, antenna performance is improved without loss of providing reliable wireless data communications with constant stability, and without depending on use locations, use states, environments and the like.

Since the antenna element is preferably disposed on the antenna substrate and the ground conductor of the substrate is preferably connected to the display housing, the conductive display housing also serves as a ground conductor to improve antenna performance.

The opening provided in the display housing is preferably formed to have the perimeter equal to or longer than one wavelength of the frequency used in wireless data communications, which can reduce the effect of the conductive display housing on the antenna characteristic.

The cover made of a material with minimal effects on antenna performance, such as plastic, is preferably attached to the opening to surround the antenna mounting area, so that the cover protects the antenna and prevents the degradation of the antenna characteristic.

Other embodiments of the electronic device according to the present invention will be described. The same portions as those of the first embodiment will be indicated by the same reference numerals and their detailed description will be omitted.

Second Embodiment

Figure 7:
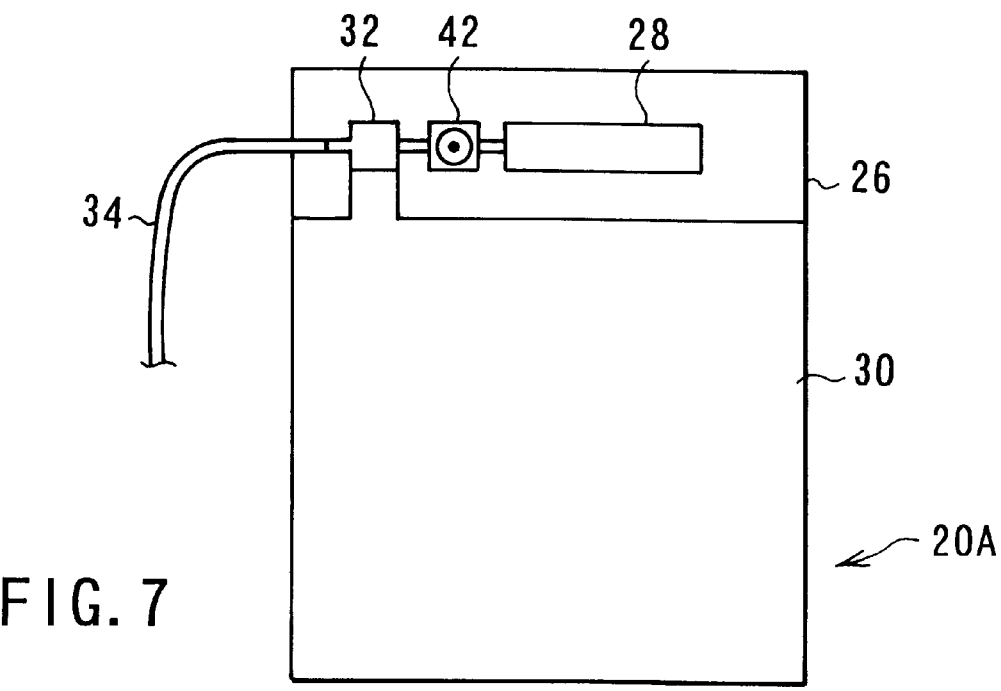
FIG. 7 is a diagram showing the detailed configuration of an antenna in a second embodiment of the electronic device with a communication feature according to the present invention.

FIG. 7 is a schematic diagram showing the configuration of an antenna of the second embodiment. The antenna is mounted at the same position as the first embodiment shown in FIGS. 1 and 5. An antenna 20A of the second embodiment differs from the antenna 20 shown in FIG. 3 in that an RF connector 42 with a switching feature may be also mounted on the antenna substrate 26. The remaining configuration is identical to that of the first embodiment. The RF connector 42 with a switching feature is connected at some point on an RF signal path between the coaxial connector 32 and the antenna element 28 and can acquire an RF signal passed between the antenna element 28 and the transmit/receive circuit module 24. Although not shown, the antenna cover 36 made of plastic or the like and attached to the opening 22 is removable or freely attached and detached in the second embodiment.

Figure 8:
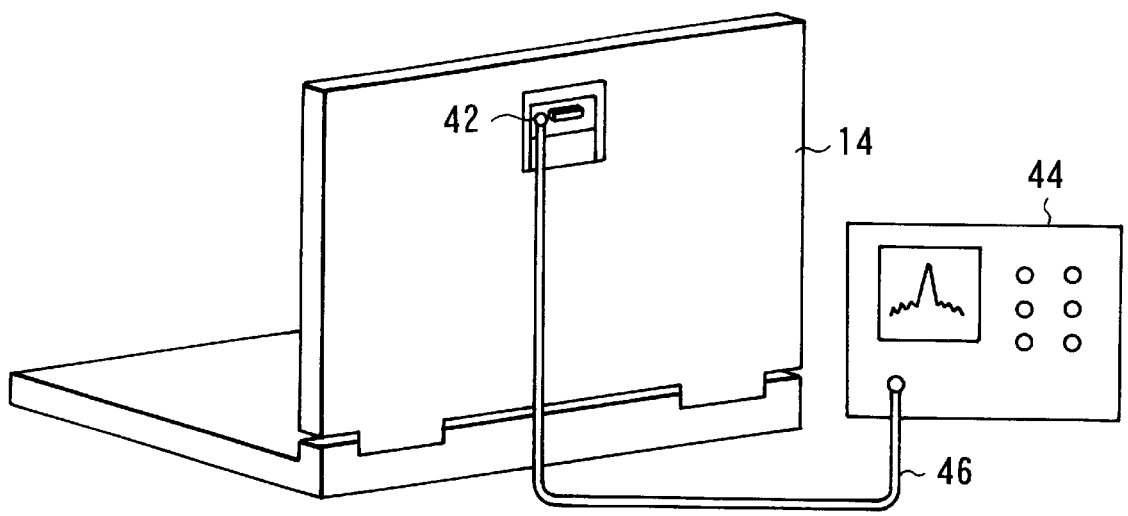
FIG. 8 shows how performance of an RF module is measured in the second embodiment.

With such a configuration, as shown in FIG. 8, before shipment of a product, the antenna cover 36 may be detached and a jig 44 for measurement (e.g., a spectrum analyzer) may be connected to the RF connector 42 with a switching feature through a coaxial cable 46 to analyze RF signals transmitted from the transmit/receive circuit module 24. It is thus possible to easily check the performance of the transmit/receive circuit module 24 mounted in the PC body 12.

As described above, according to the second embodiment, the RF connector 42 with a switching feature is provided on the antenna substrate 26, and the antenna cover 36 is removable. Even with the antenna being mounted on the liquid crystal display housing 14 as shown in FIG. 8, the antenna cover 36 may be detached, the jig 44 for measurement (such as a spectrum analyzer) may be connected to the RF connector 42 through the coaxial cable 46 so that it is easy to check the performance of the RF module 24 mounted in the PC body 12.

The present invention is not limited to the aforementioned embodiments, and may be embodied with various modifications. For example, while the above description has been made for a portable notebook-type personal computer by way of example, the present invention is applicable to a desktop personal computer as well.

Since the above embodiments employ the conductive cover made of a magnesium alloy or the like in the display housing, the opening is preferably provided to surround the antenna mounting area in order to reduce the effects of the display housing on the antenna performance. Alternatively, a portion of the conductive cover may be not applied with magnesium coating to form a nonconductive area, thereby providing an equivalent opening. In this case, the cover is advantageously manufactured integrally. In addition, when the display housing can be made of two kinds of materials in combination, a portion of a conductive member for mounting the antenna may be formed to be nonconductive.

Figure 9A:
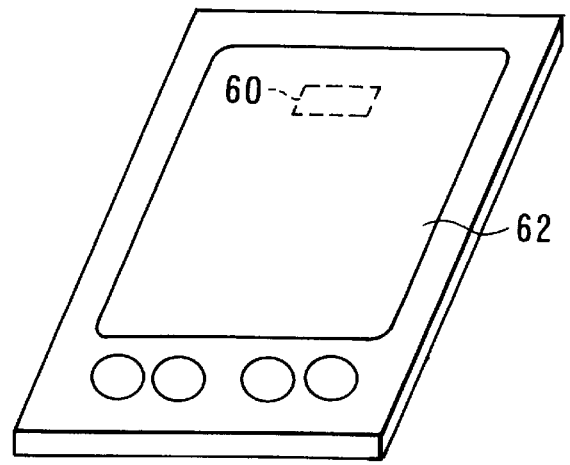
FIGS. 9A and 9B illustrate a third embodiment of the electronic device with a communication feature according to the present invention.
Figure 9B:
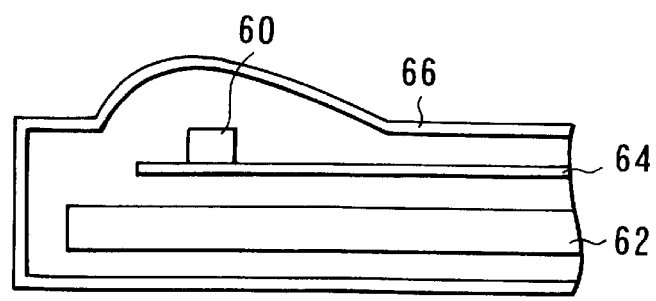

The present invention is also applicable to a palmtop-type personal computer, such as a so-called personal digital assistant (PDA), which does not have a hardware keyboard. In this case, as shown in FIG. 9A, an antenna 60 may be placed on a surface corresponding to the back when a user holds the personal computer in his/her hand, preferably in an upper central portion of the back. In this case, since a circuit substrate is typically already placed on the back of a display panel 62, an antenna substrate is not required for mounting the antenna 60, and the antenna 60 may be directly disposed on a circuit substrate 64 as shown in FIG. 9B. The back of a housing 66 may curve outward in this case.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. An electronic device, comprising:
   a display section including a housing having a display surface on its front;
   an antenna provided in an opening in a back of said housing, wherein said housing is made of a conductive material; and
   a communication section configured to perform wireless communications by using said antenna, wherein a nonconductive portion is provided in the back of said housing, and said antenna is provided in said nonconductive portion.

2. The electronic device according to claim 1, wherein said opening is covered with a cover.

3. The electronic device according to claim 2, wherein said cover is formed of a nonconductive material.

4. The electronic device according to claim 2, wherein said cover is removable, and said electronic device further includes a signal output terminal on a signal path between said antenna and said communication section.

5. The electronic device according to claim 1, wherein a perimeter length of said opening is equal to or longer than one wavelength of a frequency used in wireless communications.

6. The electronic device according to claim 1, wherein a perimeter length of said nonconductive portion is equal to or longer than one wavelength of a frequency used in wireless communications.

7. The electronic device according to claim 1, wherein said housing is grounded.

8. The electronic device according to claim 1, wherein said antenna is provided in a central portion in said opening in a width direction.

9. The electronic device according to claim 1, wherein said antenna is provided in an upper portion in said opening in a vertical direction.

10. The electronic device according to claim 1, wherein said antenna projects outward from the back of said housing.

11. The electronic device according to claim 1, wherein said antenna includes an antenna substrate and an antenna element provided on said antenna substrate, said antenna substrate including a printed circuit board formed with a conductive pattern for grounding, and said antenna substrate is connected to said housing.

12. The electronic device according to claim 11, wherein a perimeter length of the conductive pattern is in a range of about 0.7 to about 1.4 of a wavelength of a frequency used in wireless communications.

13. An electronic device, comprising:
a display section including a housing having a display surface on its front;
an antenna provided on a back of said housing; and
a communication section configured to perform wireless communications by using said antenna, wherein said housing is made of a conductive material, a nonconductive portion is provided in the back of said housing, and said antenna is provided in said nonconductive portion.

14. The electronic device according to claim 13, wherein said housing is made of a conductive material, an opening is provided in the back of said housing, and said antenna is provided in said opening.

15. The electronic device according to claim 14, wherein said opening is covered with a cover.

16. The electronic device according to claim 15, wherein said cover is formed of a nonconductive material.

17. The electronic device according to claim 15, wherein said cover is removable, and said electronic device further includes a signal output terminal on a signal path between said antenna and said communication section.

18. The electronic device according to claim 14, wherein a perimeter length of said opening is equal to or longer than one wavelength of a frequency used in wireless communications.

19. The electronic device according to claim 13, wherein a perimeter length of said nonconductive portion is equal to or longer than one wavelength of a frequency used in wireless communications.

20. The electronic device according to claim 13, wherein said housing is grounded.

21. The electronic device according to claim 13, wherein said housing is made of a nonconductive material applied with conductive coatings, a portion to which said conductive coatings are not applied is provided on the back of said housing, and said antenna is provided in said portion to which said conductive coatings are not applied.

22. The electronic device according to claim 21, wherein a perimeter length of said portion to which said conductive coatings are not applied is equal to or longer than one wavelength of a frequency used in wireless communications.

23. The electronic device according to claim 21, wherein said housing is grounded.

24. The electronic device according to claim 13, wherein said antenna is provided in a central portion in a width direction.

25. The electronic device according to claim 13, wherein said antenna is provided in an upper portion in a vertical direction.

26. The electronic device according to claim 13, wherein said antenna projects outward from the back of said housing.

27. The electronic device according to claim 13, wherein said antenna includes an antenna substrate and an antenna element provided on said antenna substrate, said antenna substrate including a printed circuit board formed with a conductive pattern for grounding, and said antenna substrate is connected to said housing.

28. The electronic device according to claim 27, wherein a perimeter length of conductive pattern is in a range of about 0.7 to about 1.4 of a wavelength of a frequency used in wireless communications.

29. A computer, comprising:
a computer body having a keyboard;
a display section connected to said computer body through a hinge in an openable and closable manner and including a display surface on a front, said display section including a housing made of magnesium alloy and an opening formed on a back, said opening being covered with a nonconductive cover;
an antenna provided in said opening; and
a communication section provided in said computer body configured to perform wireless communications by using said antenna, wherein said antenna and said communication section are connected by a wire passing through the hinge.

30. The computer according to claim 29, wherein said cover is removable, and said antenna includes a signal output terminal.

31. An electronic device, comprising:
a display section including a housing having a display surface on its front;
an antenna provided in an opening in a back of said housing, wherein said housing is made of a conductive material; and
a communication section configured to perform wireless communications by using said antenna, wherein said antenna projects outward from the back of said housing.

32. An electronic device, comprising:
a display section including a housing having a display surface on its front;
an antenna provided in an opening in a back of said housing, wherein said housing is made of a conductive material; and
a communication section configured to perform wireless communications by using said antenna, wherein said antenna includes an antenna substrate and an antenna element provided on said antenna substrate, said antenna substrate including a printed circuit board formed with a conductive pattern for grounding, and said antenna substrate is connected to said housing.

33. An electronic device, comprising:
a display section including a housing having a display surface on its front;
an antenna provided in an opening in a back of said housing, wherein said housing is made of a conductive material; and a communication section configured to perform wireless communications by using said antenna, wherein said housing is made of a nonconductive material applied with conductive coatings, a portion to which said conductive coatings are not applied is provided on the back of said housing, and said antenna is provided in said portion to which said conductive coatings are not applied.

34. An electronic device, comprising:

a display section including a housing having a display surface on its front;

an antenna provided on a back of said housing; and a communication section configured to perform wireless communications by using said antenna, wherein said antenna projects outward from the back of said housing.

35. An electronic device, comprising:

a display section including a housing having a display surface on its front;

an antenna provided on a back of said housing; and a communication section configured to perform wireless communications by using said antenna, wherein said antenna includes an antenna substrate and an antenna element provided on said antenna substrate, said antenna substrate including a printed circuit board formed with a conductive pattern for grounding, and said antenna substrate is connected to said housing.

36. An electronic device, comprising:

a display section including a housing having a display surface on its front;

an antenna provided in an opening provided at only a back of said housing, wherein said housing is made of a conductive material; and a communication section configured to perform wireless communications by using said antenna.

37. An electronic device, comprising:

a display section including a housing having a display surface on its front;

an antenna provided at only a back of said housing; and a communication section configured to perform wireless communications by using said antenna.

38. A computer, comprising:

a computer body having a keyboard;

a display section connected to said computer body though a hinge in an openable and closable manner and including a display surface on a front, said display section including a housing made of magnesium alloy and an opening formed at only a back, said opening being covered with a nonconductive cover;

an antenna provided in said opening; and a communication section provided in said computer body configured to perform wireless communications by using said antenna.

* * * * *